April 12, 1966     H. G. MATTHEWS, JR     3,246,308
REMOTE SIGNAL SENSING SYSTEM
Filed Aug. 23, 1962
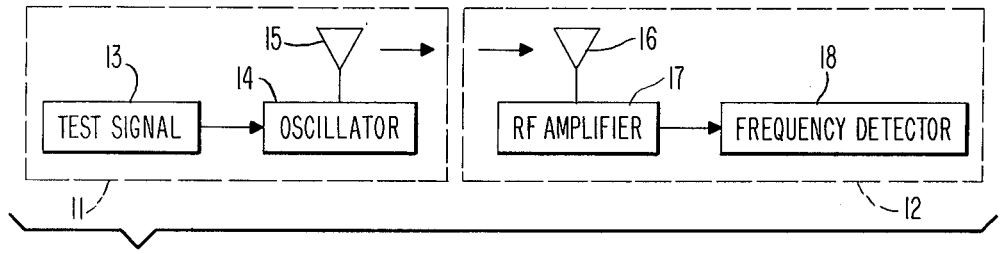
*Fig.1*
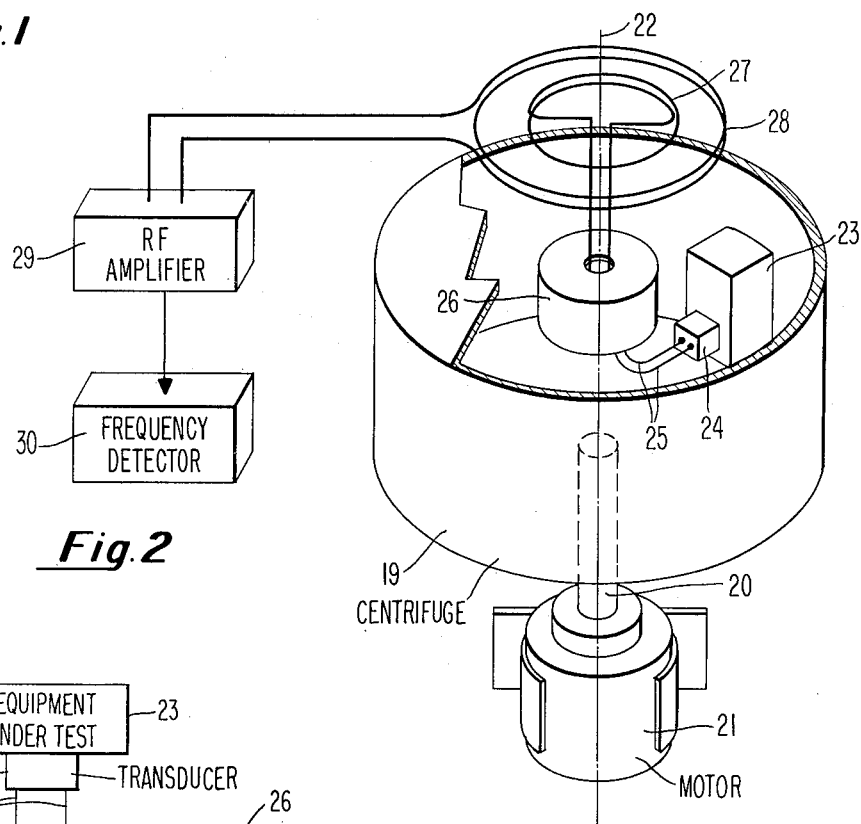
*Fig.2*
*Fig.3A*
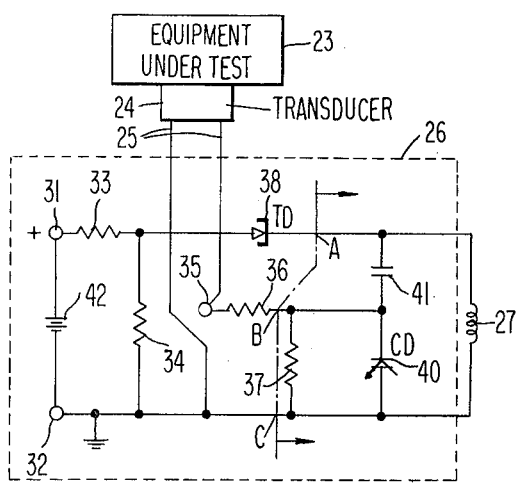
*Fig.3*
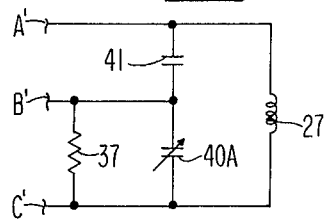
INVENTOR.
HENRY G. MATTHEWS JR.
BY
ATTORNEY United States Patent Office 3,246,308
Patented Apr. 12, 1966

3,246,308
REMOTE SIGNAL SENSING SYSTEM
Henry G. Matthews, Jr., Narberth, Pa., assignor to Burroughs Corporation, Detroit, Mich., a corporation of Michigan
Filed Aug. 23, 1962, Ser. No. 218,995
6 Claims. (Cl. 340—177)

This invention relates to a remote signal sensing system and more particularly to an improved remote signal sensing system for monitoring the condition and performance of equipment being tested in a centrifuge.

Commonly used remote signal sensing and relaying systems provide, at best, only relative indications of changes and such systems are often adversely affected by the conditions which make the signal source remote. For example, consider electronic or mechanical equipment being tested in a high speed centrifuge. Since a "before and after" reading of the condition of the equipment indicates very little as to its performance during the test, a continuous reading or monitoring of the equipment condition and performance is desirable and often necessary. Heretofore in the prior art, slip rings were attached to the centrifuge and connected by leads to a signal source associated with the equipment being tested. In the case of mechanical equipment, the signal source is any suitable transducer such as a strain gauge. When testing electronic equipment, the leads may be connected directly to a signal source such as a voltage whose magnitude is indicative of the magnitude of a condition being monitored. Stationary brushes in pressure contact with the slip rings permit completion of an electrical monitoring circuit independent of the motion of the centrifuge. Such a system permits continuous and direct readings of the condition being monitored during a test. However, the use of slip rings has many inherent disadvantages such as: inconsistent and unreliable contact resistance because a mere pressure contact between electrical conductors is inherently poor which becomes more pronounced when inter-contact motion exists due to changes in contact area and pressure with speed, friction, and contact wear; small test signal changes become indistinguishable due to contact noise generated by the changing contact resistance; delicate adjustments are required to obtain optimum readings; and contact friction and wear requires frequent maintenance.

Accordingly an object of this invention is to provide an improved remote signal sensing system.

Another object of this invention is to provide an improved remote signal sensing system for monitoring equipment being tested in a centrifuge.

A further object of this invention is to provide a remote signal sensing system for monitoring conditions in a centrifuge and having a non-mechanical coupling between the transmitting and receiving portion of the system.

Still another object of this invention is to provide a remote signal sensing system having an improved, physically small, self-contained, reliable and substantial maintenance free transmitting oscillator.

A still further object of this invention is to provide an improved remote signal sensing system that eliminates the disadvantages of the prior art as set forth hereinabove.

These and other objects of the present invention are accomplished by providing a remote signal sensing system for monitoring conditions produced in equipment being tested in a centrifuge wherein the sensing system contains a transmitting and a receiving portion and wherein the transmitting portion is attached to the centrifuge and is linked by non-mechanical coupling means to the receiving portion which is not attached to the centrifuge.

More specifically, the present invention utilizes a centrifuge adapted to receive apparatus that produces a signal indicative of the magnitude of a condition induced by the centrifuge. A variable frequency transmitting oscillator is attached to the centrifuge and includes a frequency tuned circuit having a voltage variable capacitance serially connected in a circuit which is in parallel with an inductance. The voltage variable capacitor is adapted to receive the indicative signal whereby its capacitance is varied thereby changing the frequency of the transmitting oscillator. The inductance of the tuned circuit is a circular transmitting coil mounted on the exterior of the centrifuge and having its center coincident with the axis of rotation of the centrifuge. A stationary circular pickup coil is located adjacent the transmitting coil in a coupling relationship thereto and also has its center coincident with the axis of rotation of the centrifuge. The frequency of the transmitting oscillator, which is indicative of the magnitude of the condition being monitored, is induced in the circular pickup coil. A radio frequency amplifier is coupled to the pickup coil and amplifies the radio frequency signal induced therein and applies it to frequency detecting means from which a reading of the condition being monitored may be made.

These and other features of the present invention are described in detail herein below in conjunction with the following drawings wherein:

FIGURE 1 is a block diagram illustrating the present invention;

FIGURE 2 is a diagramatic illustration of a preferred embodiment of the present invention; and FIGURES 3 and 3A illustrate a schematic diagram of the transmitting oscillator used in the preferred embodiment of the present invention shown in FIGURE 2.

Referring now to FIGURE 1, which shows the present invention in block diagram form, there is shown a transmitting portion indicated within the dotted outline 11 which includes a test signal 13 which is applied to the oscillator 14. The frequency of the oscillator 14 is a function of the magnitude of the test signal 13 and is radiated by the transmitting antenna 15.

The receiving portion is indicated within the dotted outline 12 and includes a receiving or pickup antenna 16 which receives the radio frequency signal transmitted by the transmitting antenna 15 and applies it to an RF amplifier 17. The output of the amplifier 17 is coupled to the frequency detector 18 from which a reading of the condition being monitored can be made.

FIGURE 2 illustrates in greater detail a preferred embodiment of the present invention in which there is shown a centrifuge 19 having an axis of rotation 22. The centrifuge 19 is rotated by suitable driving means such as the motor 21 which is coupled to the centrifuge by way of the shaft 20. Contained within the centrifuge 19 is equipment 23 to be tested which may be mechanical, electrical or electronic equipment. Attached to the equipment 23 is any suitable transducer 24 which produces a D.C. signal the magnitude of which is indicative of some local condition in the equipment 23 being tested. As will be obvious to those skilled in the art, when electronic or electrical equipment is being tested a transducer 24 is often not necessary inasmuch as a voltage level source within the equipment may provide the necessary D.C. signal. For example, when testing a battery in the centrifuge 19, the leads 25 may be directly connected to the terminals of the battery to monitor the condition of the battery under load conditions in a revolving high speed centrifuge.

Attached to the centrifuge 19 is a variable frequency oscillator 26 which is coupled to the transducer 24 by way of leads 25. Associated with the transmitting oscillator 26 is a circular transmitting coil such as the helical coil 27 which is mounted on the exterior of the centrifuge and has its center coincident the axis of rotation 22 of the centrifuge 19. Located adjacent and concentric to the transmitting coil 27 is a stationary circular pickup coil such as the helical coil 28 which also has its center coincident the axis of rotation 22 of the centrifuge 19 Coupled to the pickup coil 28 is an RF amplifier 29 whose output is applied to a frequency detector 30.

The operation of the embodiment of FIGURE 2 is such that equipment 23 to be tested is placed in the centrifuge 19. The transducer 24, if needed, is appropriately coupled to the equipment 23 to produce a signal indicative of the magnitude of the condition in the equipment 23 which is to be tested. The centrifuge 19 is then driven at high speeds by the motor 21. During the testing period, the signal indicative of the magnitude of the condition being tested is applied by way of leads 25 to the transmitting oscillator 26 where a frequency proportional to the magnitude of the indicative signal is produced and transmitted from the rotating circular transmitting coil 27. Since the now rotating transmitting circular, or helical, coil 27 has its center coincident the axis of rotation of the centrifuge 19, its relative position remains stable.

The stationary circular, or helical, pickup coil 28 receives the electromagnetic radio frequency waves transmitted by the coil 27 and applies them to the RF amplifier 29 where they are amplified and then applied to the frequency detector 30. A reading of the frequency is made at the frequency detector 30 which is indicative of the magnitude of the indicative signal and therefore a measure of the condition being tested.

When the signal appearing on the leads 25 varies at a relatively low rate, the frequency detector 30 may be a frequency counter such as a Hewlett-Packard 10-megacycle counter, model 524B, which gives a continuous visual digital reading of the frequency to four decimal places which may be read at predetermined time intervals. By properly calibrating the transmitting oscillator 26, the frequency reading at the frequency detector 30 will correspond to a predetermined magnitude of test signal appearing on the leads 25.

The oscillator 26 attached to the centrifuge 19, as shown in FIGURE 2, is illustrated in schematic form in FIGURES 3 and 3A. Referring now to FIGURE 3, there is shown a tuned frequency determining circuit including a capacitor 41 serially connected to a voltage variable capacitor 40 both of which are in parallel with an inductance 27. The inductance 27 comprises the circular transmitting coil 27 shown in FIGURE 2. That is, the inductance 27 functions both as a transmitting antenna and as the inductance of a parallel tuned circuit. The junction of the capacitor 41 with the inductance 27 is coupled, by way of the tunnel diode 38 and the resistor 33, to a source of positive potential, such as the positive terminal of the battery 42 which is applied to the terminal 31. The junction of the voltage variable capacitor 40 with the inductance 27 is coupled to the terminal 32 which is at ground potential. A resistor 34 is coupled between ground potential and the junction of the resistor 33 with the tunnel diode 38. The voltage divider network comprising the resistor 33 and the resistor 34 biases the tunnel diode 38 in its negative resistive region.

The tunnel diode 38 is the active element of the oscillator and because it is biased in its negative resistive region, it causes the tuned frequency determining circuit (comprising the capacitor 41 in series with the voltage variable capacitor 40 both of which are in parallel with the inductance 27) to oscillate. The signal appearing on the leads 25 of FIGURE 2 has a magnitude indicative of the condition being tested and is applied to the voltage variable capacitor 40 by way of the terminal 35 and the voltage divider network comprising resistors 36 and 37 as shown in FIGURE 3. This voltage divider network functions to reduce the magnitude of the signal applied to the voltage varying capacitor 40 whenever the magnitude of the signal is higher than the voltage rating of the voltage variable capacitor 40. As the magnitude of the signal applied to the voltage variable capacitor varies in accordance with changes in the condition being tested, the capacitance of the voltage variable capacitor 40 changes correspondingly thereby changing the oscillation frequency of the parallel tuned circuit and which is coupled to the circular pickup coil 28 shown in FIGURE 2. An equivalent circuit of the frequency tuned circuit of FIGURE 3 is shown in FIGURE 3A wherein the voltage variable capacitor 40 appears as the variable capacitor 40A whose capacitance is a function of the magnitude of a D.C. signal applied thereto.

The oscillator illustrated in FIGURE 3 contains few components and such components as are used are very reliable. Accordingly, the oscillator can be constructed to be self-contained occupying a very small space and be substantially maintenance free. In one embodiment of the present invention that was constructed, the oscillator occupied approximately one cubic inch and operated at a frequency range from 3.5 to 4.0 megacycles. The inductance 27, which also served as the transmitting coil 27, contained 15 turns of number 22 wire formed into a one-inch diameter helical coil. The circular pickup coil 28 contained 8 turns of number 22 wire formed into a two-inch diameter helical coil. As will be obvious to those skilled in the art it is not necessary that the pickup coil 28 be concentric with the transmitting coil 27, for it is also possible that the transmitting 27 and pickup 28 coils can have substantially equal diameters as long as they are adjacent one another. Also, if the conditions being tested produce a rapidly varying signal, it is not practical to use a frequency detector that produces a continuous visual reading of the frequency which it is receiving which must be recorded at selected time intervals. In this case a frequency modulation detector may be used which produces a D.C. signal whose magnitude is indicative of the frequency applied to it. The D.C. signal thus produced may be applied to an oscillograph to obtain a permanent record of the frequency changes indicative of changes in the condition being monitored. As will be obvious to those skilled in the art, many other frequency detecting circuits may be used for producing a reading when the condition being tested varies rapidly.

What has been described is a remote signal sensing system for monitoring conditions produced in equipment being tested in a centrifuge. The system includes a transmitting portion which produces a signal the frequency of which is proportional to the magnitude of the condition being sensed. This frequency is non-mechanically coupled to a receiving portion which permits a continuous and direct reading of the conditions being tested.

What is claimed is:

1. A remote signal sensing system having a transmitting portion comprising a centrifuge having mechanically mounted therein means for producing an electrical signal indicative of the magnitude of a condition, a variable frequency transmitting oscillator having a frequency determining inductance axially mounted to said centrifuge and connected to receive said indicative signal and produce a frequency indicative of the magnitude of said signal, said oscillator having its frequency determining inductance coil exterior to the centrifuge and having its center coincident the axis of rotation of the centrifuge.

2. In a remote signal sensing system having a transmitting and a receiving portion, said transmitting portion comprising a centrifuge having mounted therein means for producing an electrical signal indicative of the magnitude of a condition, a variable frequency oscillator connected to said signal producing apparatus and mounted in said centrifuge for producing a frequency indicative of the magnitude of said signal including a variable frequency tuned circuit having a voltage variable capacitance, said voltage variable capacitance serially connected in a circuit that is in parallel with an inductance, said voltage variable capacitance connected to receive said indicative signal whereby its capacitance may be varied to thereby change the frequency of said variable tuned circuit, said inductance comprising a transmitting coil mounted exteriorly to the centrifuge with its center coincident with the axis of rotation of said centrifuge.

3. A remote voltage sensing system with a transmittting portion comprising a high-speed centrifuge having mounted therein means that produces an electrical voltage indicative of the magnitude of a condition, a variable frequency transmitting oscillator connected to said voltage producing apparatus centrally mounted in said centrifuge, said transmitting oscillator including a frequency determining tuned circuit having a voltage variable capacitance, said voltage variable capacitance serially connected in a circuit that is in parallel with an inductance, said voltage variable capacitance connected to receive said indicative voltage, and said inductance comprising a coil mounted on the exterior of said centrifuge having its center coincident with the axis of rotation of said centrifuge and a negative resistance means connected to said frequency determining tuned circuit for causing said tuned circuit to oscillate.

4. A remote signal sensing system comprising a centrifuge having mounted therein means for producing an electrical signal indicative of the magnitude of a condition, a variable frequency transmitting oscillator mounted to said centrifuge substantially coincident with its axis of rotation and connected to said signal producing means to receive said indicative signal and produce therefrom a frequency corresponding to the magnitude of said indicative signal, said transmitting oscillator including an L/C frequency determining network, the inductance L of which is a helically wound coil mounted exterior to the centrifuge with its center coincident the axis of rotation of the centrifuge and receiving means including a stationary helical pickup coil in a coupling relationship adjacent to the frequency determining, helically wound, inductance of the oscillator.

5. A remote voltage sensing system comprising: a high-speed centrifuge having mounted therein means that produces an electrical voltage indicative of the magnitude of a condition, a variable frequency transmitting oscillator mounted to said centrifuge and connected to receive the output of said voltage produced by said apparatus, said transmitting oscillator including; a frequency determining tuned circuit having a voltage variable capacitor, said capacitor serially connected in a circuit is in parallel with an inductance, said capacitor connected to receive said indicative voltage, said inductance comprising a circular coil mounted on the exterior of said centrifuge having its center coincident with the axis of rotation of said centrifuge; a negative resistance means for causing said frequency determining tuned circuit to oscillate connected to said tuned circuit; and a stationary circular pickup coil electromagnetically coupled to said exterior inductance and having its center coincident with the axis of rotation of said centrifuge and positioned adjacent said transmitting inductor, a radio frequency amplifier having an input and an output circuit, said input circuit of said amplifier coupled to said pickup coil and radio frequency detecting means coupled to the output circuit of said radio frequency amplifier.

6. A remote voltage sensing system comprising a high-speed centrifuge having mounted therein means that produces an electrical voltage indicative of the magnitude of a condition, a variable frequency transmitting oscillator centrally mounted to said centrifuge and connected to said signal producing apparatus for producing a frequency indicative of the magnitude of said voltage, said oscillator including a frequency determining tuned circuit having a voltage variable capacitance, said capacitance serially connected in a capacitive reactance circuit that is in parallel with an inductance, said capacitance connected to receive said indicative voltage whereby its capacitance may be varied to thereby change the frequency of said transmitting oscillator, said inductance comprising a helical transmitting coil mounted on the exterior of said centrifuge and having its center coincident with the axis of rotation of said centrifuge, a source of potential, a negative resistance device coupled between said source of potential and said frequency determining tuned circuit to cause said frequency determining tuned circuit to oscillate, a stationary toroidal pickup coil in a coupling relationship concentric to said transmitting coil having its center coincident the axis of rotation of said centrifuge, a radio frequency amplifier having an input and an output circuit, said input circuit of said amplifier coupled to said pickup coil and radio frequency detecting means coupled to the output circuit of said amplifier.

References Cited by the Examiner

UNITED STATES PATENTS

| 2,898,550 | 8/1959 | Fischer | 340—195 |
|---|---|---|---|
| 3,158,027 | 11/1964 | Kibler | 340—177 |

OTHER REFERENCES

Straube: "Voltage Variable Capacitor," Electronics Industries, vol. 17, No. 7, July 1958, pp. 77–80.

Griffith: "Mouse," Radio Electronics, vol. 31, No. 2, February 1960, pp. 101, 106.

NEIL C. READ, *Primary Examiner.*

THOMAS B. HABECKER, *Examiner.*